United States Patent [19]

Schippert et al.

[11] Patent Number: 4,723,968
[45] Date of Patent: Feb. 9, 1988

[54] METHOD AND APPARATUS FOR THE PURIFICATION OF WASTE AIR CONTAINING BIOLOGICALLY DECOMPOSABLE IMPURITIES

[75] Inventors: Egbert Schippert, Dierdorf-Brückrachdorf; Wolfgang Christl, Westerburg-Sainscheid, both of Fed. Rep. of Germany

[73] Assignee: Keramchemie GmbH, Siershahn, Fed. Rep. of Germany

[21] Appl. No.: 22,678

[22] Filed: Mar. 6, 1987

[30] Foreign Application Priority Data

Mar. 12, 1986 [DE] Fed. Rep. of Germany ....... 3608170

[51] Int. Cl.[4] .............................................. B01D 53/14
[52] U.S. Cl. .......................................... 55/80; 55/94; 55/222; 55/233; 210/615; 210/151; 435/262; 435/266
[58] Field of Search .................... 55/84, 85, 89, 90, 91, 55/94, 223, 233, 222, 80; 210/916, 915, 150, 151, 615; 435/262, 266

[56] References Cited

U.S. PATENT DOCUMENTS

| | | | |
|---|---|---|---|
| 3,828,525 | 8/1974 | Copa et al. | 55/84 X |
| 4,225,381 | 9/1980 | Ishikawa et al. | 435/262 X |
| 4,544,381 | 10/1985 | Schmidt | 55/89 |
| 4,662,900 | 5/1987 | Ottengraf | 55/90 |

FOREIGN PATENT DOCUMENTS 2643211 4/1978 Fed. Rep. of Germany ...... 435/266

Primary Examiner—Charles Hart
Attorney, Agent, or Firm—Toren, McGeady & Associates

[57] ABSTRACT

A method and an apparatus for the purification of waste air containing biologically decomposing impurities. The waste water is conducted through an absorption tower in which the impurities are absorbed by washing liquid containing an activated sludge. Subsequently, the impurities are biologically decomposed in an activated sludge basin by the microorganisms of the activated sludge. To ensure that the residual amount of washing liquid to be removed is small and only a small amount of biological excess sludge is produced even if large amounts of impurities must be decomposed, while the activated sludge basin remains relatively small, the waste air is subjected to a preliminary purification in at least two successive stages by means of a highly polluted washing liquid. Subsequently, the waste air is subjected to an after purification by means of an only lightly polluted washing liquid. The two different washing liquids are then conducted in a cascade-like manner through separate activated sludge basins. Only the washing liquid from the least polluted activated sludge basin is removed and subsequently purified.

19 Claims, 1 Drawing Figure

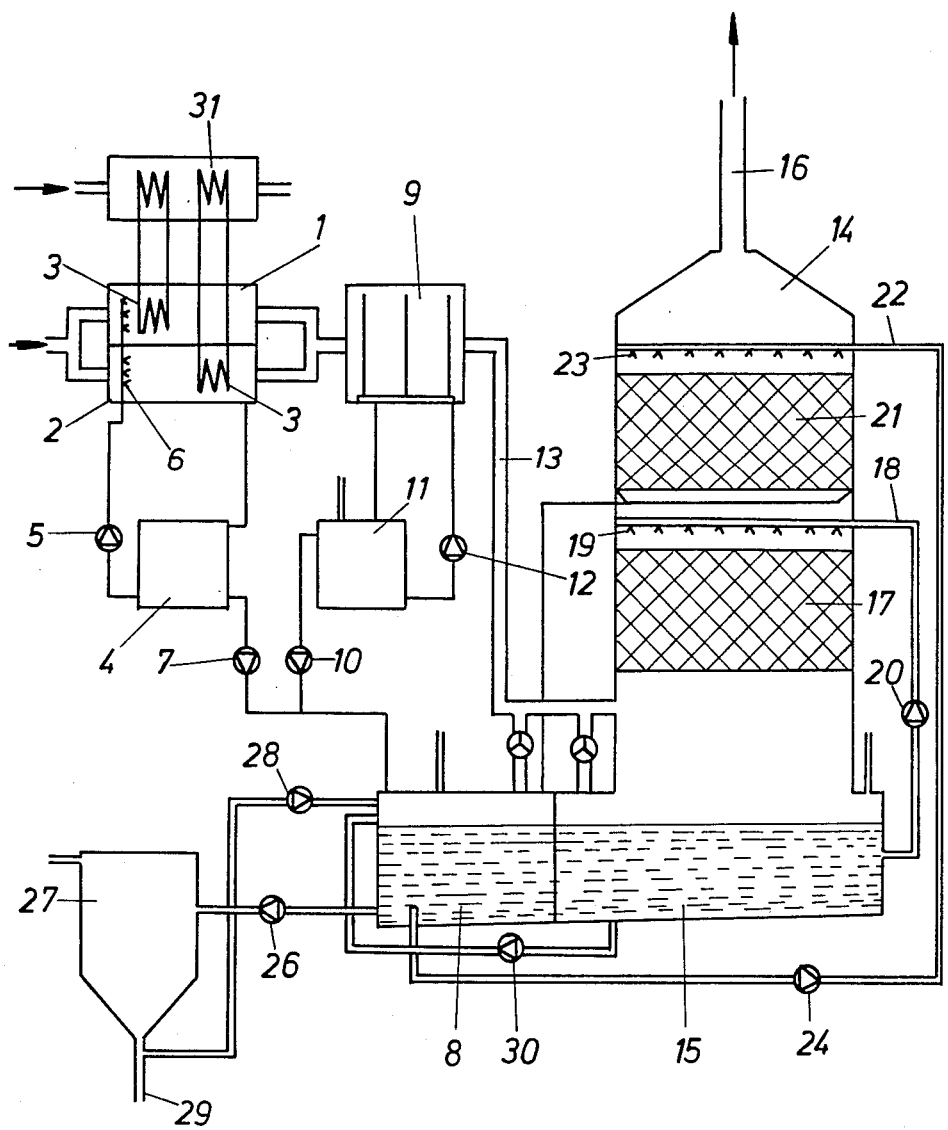

METHOD AND APPARATUS FOR THE PURIFICATION OF WASTE AIR CONTAINING BIOLOGICALLY DECOMPOSABLE IMPURITIES

BACKGROUND OF THE INVENTION

1. Field of the Invention

The present invention relates to a method for the purification of waste air containing biologically decomposable impurities. The waste air is conducted through an absorption tower in which the impurities are absorbed by washing liquid containing an activated sludge. Subsequently, the impurities are biologically decomposed in an activated sludge basin by the microorganisms of the activated sludge. The present invention further relates to an arrangement for carrying out the method.

2. Description of the Prior Art

A method for the purification of waste air containing biologically decomposible impurities is known. In that method, the waste air containing the impurities is conducted through an absorption tower containing packing bodies. An activated sludge washing liquid is conducted through the absorption tower in a countercurrent to the waste air. The activated sludge washing liquid is pumped through the absorption tower in a cycle from an activated sludge basin. When the activated sludge washing liquid comes into contact with the waste air, the impurities contained in the waste air are absorbed by the activated sludge washing liquid. The absorption capacity of the activated sludge washing liquid is dependent upon the solubility of the impurities in the washing liquid and the regeneration of the washing liquid. The absorbed impurities are biologically decomposed in the activated sludge basin by microorganisms of a specific type. The regenerated activated sludge washing liquid is then again capable of absorbing impurities from the waste air.

The known method described above has the disadvantage that the activated sludge basin must be very large if large amounts of impurities are to be decomposed or the residual amount of washing liquid to be removed is relatively large. In addition, this method produces large amounts of biological excess sludge.

It is, therefore, the primary object of the present invention to further develop a method for the purification of waste air containing biologically decomposable impurities, so that the residual amount of washing liquid to be removed is small and only a small amount of biological excess sludge is produced even if large amounts of impurities must be decomposed, while the activated sludge basin remains relatively small. It is another object of the present invention to further develop the method described above, so that it can be used economically for the purification of hot waste air containing resinous condensates from spraying chambers and/or drying chambers of paint spraying plants.

SUMMARY OF THE INVENTION

In accordance with the present invention, the waste air is subjected to a preliminary purification in at least two successive stages by means of a highly polluted washing liquid. Subsequently, the waste air is subjected to an afterpurification by means of an only lightly polluted washing liquid. The two different washing liquids are then conducted in a cascade-like manner through separate activated sludge basins. Only the washing liquid from the least polluted activated sludge basin is removed and subsequently purified.

The two purification stages and the cascade-like flow of the washing liquid ensure a high rate of decomposition even in small activated sludge basins, so that the residual concentration in the washing liquid to be removed is small. The cascade-like flow of the washing liquid, the high age of the biological sludge and the low supply of nutrients ensure that only a small amount of excess sludge is produced. The waste product is biologically purified water. Therefore, the method according to the invention is environmentally sound.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there is illustrated and described a preferred embodiment of the invention.

BRIEF DESCRIPTION OF THE DRAWINGS

In the drawing:

The single FIGURE of the drawing is a schematic illustration of an embodiment of the present invention.

DETAILED DESCRIPTION OF THE INVENTION

The FIGURE of the drawing illustrates an arrangement used for the biological purification of the waste air from a plant for spray-painting cans. Approximately 85,000 m$^3$ of waste air are produced by the spraying chambers and the drying ovens of such a plant. The waste air has a temperature of approximately 160° C. The waste air contains approximately 35 kg water-soluble solvents, such as, alcohols, glycols, ketones and glycolic ethers, 4 kg aromatic hydrocarbons, such as, toluenes, and 2 kg sticky, hardenable resinous condensates, as well as small amounts of highly odorous compounds.

The arrangement illustrated in the drawing for carrying out the method of the invention is composed of two principal portions, namely, a waste air treatment unit and a biological washing unit. In the treatment unit, the waste air is cooled down to a temperature of below 43° C. and the resinous condensates are separated. The biological washing unit serves to absorb and decompose the solvents.

The waste air treatment unit includes two air-water coolers 1, 2 which are arranged in parallel. The hot waste air removed from the plant for spray-painting cans normally flows through coolers 1, 2. Each cooler 1, 2 includes ribless cooling tubes 3 having, for example, an oval cross-section. Cooling water flows through cooling tubes 3. The hot waste air is cooled in these air-water coolers 1, 2 to the required temperature of below 43° C. During this cooling procedure, a substantial portion of the resinous condensates contained in the waste air adheres to the cooling tubes 3 and remains there as a result of polymerization. In order to continuously maintain the cooling efficiency, the cooling tubes 3 must be cleaned at regular intervals in order to remove the resins. If these resins are newly separated, they are relatively easily soluble in water or in strongly alkaline cleaning agents.

For cleaning the cooling tubes 3, the air-water coolers 1, 2 are connected to a tank 4 which is filled with a strongly alkaline cleaning liquid. A pump 5 serves to spray the cleaning liquid from container 4 through spraying nozzles 6 onto the cooling tubes 3 in the air-water coolers 1, 2 and, thus, the resins are removed from the cooling tubes 3. The cleaning liquid containing the resinous condensates separated or washed off in this manner flows in a cycle into tank 4. The resins dissolved in the cleaning liquid are biologically decomposable and are removed from time to time by adding them by means of a pump 7 to an activated sludge basin 8 of the biological washing unit which will be described below.

In order to ensure a sufficient cooling of the waste air during such a cleaning period, the two air-water coolers 1,2 are only alternately cleaned, so that the entire air from the spray-painting plant for cans flows through only one of the two air-water coolers 1 or 2. As a result, the waste air is not subjected to the same cooling procedure during the cleaning period as during normal operation. The additionally required cooling of the waste air to a temperature below 43° C. is effected in a subsequent washer 9.

The washer 9 includes two so-called spraying zones which are each provided with a subsequently arranged high-efficiency mist eliminator. In this mist eliminator, not only the aforementioned cooling is effected, but the fine resinous condensates are also separated and dissolved in the spraying liquid, thereby enriching the spraying liquid. The resins of low molecular weight dissolved in the water are also biologically decomposable and are removed by adding them by means of a pump 10 to the aforementioned activated sludge basin 8. The spraying liquid, such as water, is in a tank 11 and is conducted in a cycle by means of pump 10. During the operation of the two air-water coolers 1, 2, no significant cooling of the waste air takes place in washer 9. The cooled waste air is conducted from washer 9 through a line 13 to the biological washing unit.

In the embodiment of the invention illustrated in the drawing, the biological washing unit includes a two-stage absorption tower 14 which at its lower end is in communication with an activated sludge basin 15. Activated sludge basin 15 also serves as the so-called sump for the absorption tower. The line 13 for the waste air leads laterally to the absorption tower 14 at a distance above the activated sludge basin 15. A discharge opening 16 for the purified air is provided at the upper end of the absorption tower 14. A packing body layer 17 supported by support elements which are not shown are provided on the inner wall of absorption tower 14 at a distance above line 13. A pipe 18 is provided above packing body layer 17. Pipe 18 has a plurality of spraying nozzles 19 arranged uniformly distributed over the cross-section of the absorption tower 14. The liquid from the activated sludge basin 15 is sprayed or distributed by means of a pump 20 through the spraying nozzles 19 onto the packing body layer 17.

Above pipe 18 and above an air-permeable dividing plate 21a is located another packing body layer 21. A pipe 21 with spraying nozzles 23 is arranged above packing body layer 21. Pipe 22 is connected through a pump 24 with the activated sludge basin 8.

The waste air from which the resinous condensates have been removed, but which still contains pollutants, is conducted to the absorption tower 14 from below. Weakly alkaline washing liquids containing activated sludge from the two activator sludge basins 8, 15 are sprayed in the two separate stages in a countercurrent to the waste air. The material exchange takes place in the packing body layers 17, 21 which have a large free passage surface and, thus, effect a strong turbulence of waste air and washing liquid. This results in a high degree of surface renewal which is important for a good material exchange. The spraying nozzles 19, 23 are full cone nozzles which are resistant to clogging. Due to the high trickling density and the use of controlled packing body layers, no biological film is formed on the structural components of the unit. After the washing liquids leave the individual packing body layers containing the pollutants and solvents, they return into the respective activated sludge basin 8, 15. The water droplets taken along by the waste air are separated after each stage by means of a known, dynamic mist eliminator.

The biological regeneration of the polluted washing liquids and the decomposition of the absorbed pollutants takes place in the activated sludge basins 8, 15. The bacteria in the activated sludge basins 8, 15 decompose the organic materials into carbon dioxide and water. Simultaneously, a small amount of biological excess sludge is produced.

Since the oxygen introduced into the absorption tower 14 is usually not sufficient in order to supply the bacteria, immersion aerators may be placed in the activated sludge basins 8, 15. These aerators may be operated alternately by means of a timer. When a measurement of the oxygen indicates that it has fallen below a predetermined concentration, two immersion aerators may be operated simultaneously.

An excessive enrichment of the washing liquids with biological inhibitors is prevented by continuously removing a certain amount of washing liquid from each of the two activated sludge basins 8, 15 and to replace it by fresh water in activated sludge basin 15. The washing liquid removed from basin 15 is added to activated sludge basin 8. The washing liquid removed from basin 8 is conducted by means of a pump 26 into a settling basin 27. Sedimentation takes place in this settling basin 27. The purified washing liquid can then again be supplied as necessary by means of a pump 28 to activated sludge basin 8. The sludge is removed through a line 29.

In order to achieve a high decomposition rate, i.e., a rate exceeding 200 mg/l.h of solvent, the activated sludge basin 15 is operated with a high solvent concentration. The continuously removed washing liquid is added by means of pump 30 to activated sludge basin 8. The activated sludge basin 8 is operated with only a low solvent concentration; this means that only a low rate of decomposition is obtained, however, the advantage is provided that no problems are created with respect to polluted water. Due to the high residual solvent concentration in activated sludge basin 15 and the high biological decomposition rate, it is possible to reach a decomposition rate of about 200 g solvent per hour and $m^3$ of the activated sludge basin. Thus, relatively small activated sludge basins can be used. Since the sludge is of very light weight, and the sludge has the tendency to float, the sludge can be advantageously separated by a flotation method.

The following decomposition values were obtained in the case of waste air emanating from a plant for paint-spraying cans:
Water-soluble solvents 95%
Aromatic hydrocarbons 60%
Highly odorous compounds 95%.

The polluted water concentration (COD) was smaller than 200 mg $O_2$/l.

In the nutrient amounts supplied to the washing liquid, the ratio of carbon to nitrogen may be greater than 200 and the ratio of carbon to phosphorus may be greater than 1000.

In the embodiment illustrated in the drawing, an additional heat exchanger 31 may be provided for absorbing the heat absorbed in the air-water coolers 1, 2.

While the specific embodiment of the invention has been shown and described in detail to illustrate the application of the inventive principles, it will be understood that the invention may be embodied otherwise without departing from such principles.

We claim:

1. A method for the purification of waste air containing biologically decomposable impurities, comprising conducting the waste air through an absorption tower, absorbing the impurities in the absorption tower by a washing liquid containing activated sludge, and subsequently biologically decomposing the impurities in an activated sludge basin by the microorganisms of the activated sludge, the improvement comprising subjecting the waste air to a preliminary purification in at least two successive stages by means of a highly polluted washing liquid, subjecting the waste air to an after-purification by means of an only lightly polluted washing liquid, conducting the highly polluted washing liquid and the lightly polluted washing liquid in separated activated sludge basins in a cascade-like manner, and removing and subsequently purifying only the washing liquid contained in the least polluted activated sludge basin.

2. The method according to claim 1, comprising adding nutrients to the washing liquids.

3. The method according to claim 2, wherein the nutrients are nitrogen and phosphorus added in ratios of carbon to nitrogen greater than 200 and carbon to phosphorus greater than 1000.

4. The method according to claim 1, comprising replacing the washing liquid removed from the highly polluted activated sludge basin by fresh water.

5. The method according to claim 1, wherein the waste air emanates from spraying chambers or drying chambers of spray-painting plants, the waste air containing resinous condensates and having a high temperature, comprising cooling the waste air before it enters the absorption tower and separating the resinous condensates.

6. The method according to claim 5, wherein the waste air is cooled in a heat exchanger and the resinous condensates contained in the waste air are separated in a washer.

7. The method according to claim 5, wherein cooling the waste air and separating the resinous condensates are carried out in a combined heat exchanger and washer unit.

8. The method according to claim 6, wherein the heat exchanger is periodically sprayed with a highly alkaline cleaning liquid, so that the resinous condensates separated onto the heat exchanger are washed off.

9. The method according to claim 4, wherein the low-molecular resinous condensates which have been separated and dissolved in water are added to the slightly polluted activated sludge basin.

10. Apparatus for the purification of waste air containing biologically decomposable impurities, comprising an absorption tower, at least two separate spraying zones arranged in the absorption tower, activated sludge basins separately in communication with each of the spraying zones, the activated sludge basins being located at the bottom of the absorption tower, means for providing a cascade-like flow between the activated sludge basins, an inlet for introducing waste air into the absorption tower located between the spraying zones and the activated sludge basins, and an outlet for the purified air at the top of the absorption tower.

11. The apparatus according to claim 10, wherein the two spraying zones are arranged in the absorption tower one above the other.

12. The apparatus according to claim 10, comprising a heat exchanger and a washer for the waste air upstream of the inlet opening to the absorption tower.

13. The apparatus according to claim 12, wherein the heat exchanger and the washer are combined in a single unit.

14. The apparatus according to claim 12, wherein the heat exchanger comprises two air-water coolers arranged in parallel.

15. The apparatus according to claim 14, wherein waste air can be admitted to the two air-water coolers at the same time or alternately.

16. The apparatus according to claim 14, wherein the two air-water coolers comprise spraying nozzles for an alkaline cleaning liquid and means for supplying the alkaline cleaning liquid in a cycle.

17. The apparatus according to claim 15, wherein the air-water coolers are cooled by cooling water, the cooling water being conducted in a cycle.

18. The apparatus according to claim 17, comprising another heat exchanger in the cooling water cycle of the air-water coolers.

19. The apparatus according to claim 12, wherein the washer includes a spraying zone with a high efficiency mist eliminator.

* * * * *